US007249986B2

(12) United States Patent
Otobe et al.

(10) Patent No.: US 7,249,986 B2
(45) Date of Patent: Jul. 31, 2007

(54) ENGINE SPEED CONTROL SYSTEM FOR OUTBOARD MOTOR

(75) Inventors: Taiichi Otobe, Wako (JP); Hiroshi Watabe, Wako (JP); Hideaki Takada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 33 days.

(21) Appl. No.: 11/218,452

(22) Filed: Sep. 2, 2005

(65) Prior Publication Data

US 2006/0052015 A1 Mar. 9, 2006

(30) Foreign Application Priority Data

Sep. 8, 2004 (JP) ............................ 2004-261254

(51) Int. Cl.
*B60W 10/04* (2006.01)
*B63H 21/21* (2006.01)

(52) U.S. Cl. .......................................... 440/87; 440/84

(58) Field of Classification Search .................... None
See application file for complete search history.

(56) References Cited

U.S. PATENT DOCUMENTS 4,594,916 A * 6/1986 Ito et al. ....................... 477/43
4,817,466 A * 4/1989 Kawamura et al. ......... 477/112
6,364,726 B1 * 4/2002 Motose et al. ................ 440/86

FOREIGN PATENT DOCUMENTS

JP 2000-328996 11/2000

* cited by examiner

*Primary Examiner*—Jesus Sotelo
*Assistant Examiner*—Daniel V. Venne
(74) *Attorney, Agent, or Firm*—Carrier, Blackman & Associates, P.C.; Joseph P. Carrier; William D. Blackman

(57) ABSTRACT

In an engine speed control system for an outboard motor, overrev prevention control is implemented which determines whether the engine overrevs by comparing the detected engine speed and a desired speed and responds to a determination that the engine overrevs (in which case the cause of the engine speed increase is probably reduced load caused by sucking in of air and/or exhaust gas by the propeller) by driving an electric throttle motor in the direction of reducing the throttle opening, thereby lowering the engine speed to the desired speed. Owing to this configuration, the problem of decline in thrust owing to intake of air and/or exhaust gas by the propeller can be quickly overcome irrespective of operator skill, thereby improving power performance and steerability.

14 Claims, 7 Drawing Sheets

ENGINE SPEED CONTROL SYSTEM FOR OUTBOARD MOTOR

BACKGROUND OF THE INVENTION

1. Field of the Invention

This invention relates to an engine speed control system for an outboard motor.

2. Description of the Related Art

When a boat powered by an outboard motor turns, accelerates or experiences certain wave conditions in the course of travel, the propeller of the outboard motor may suck in air from above the water surface and/or engine exhaust gas. When the propeller draws in air or exhaust gas, the load on the propeller decreases so that the speed of the engine rotating it rises. This may lead to overrev.

This problem is dealt with by Japanese Laid-Open Patent Application No. 2000-328996 ('996), for example, which teaches a configuration that responds to a detected engine speed exceeding a maximum speed (rev limit) by halting the operation of some of the engine cylinders, thereby lowering the engine speed below the maximum speed.

However, when considering the problem of air and exhaust gas sucked in by the propeller, it should be taken into account that the rise in engine speed owing to reduced load is accompanied by a simultaneous decrease in the thrust produced by the propeller, which gives rise to the problem of degraded power performance and steerability.

Ordinarily, therefore, the operator relies on experience to judge from the tachometer reading and engine noise that the propeller is sucking in air or exhaust gas and regulates the throttle opening finely to lower the engine speed to a level at which intake of air and/or exhaust gas no longer occurs. The period of time required to restore thrust after the propeller begins to suck in air and/or exhaust gas (i.e., the duration of degraded power performance and steerability) therefore depends on the skill of the operator.

The foregoing prior art is directed to preventing engine overrev owing to intake of air or exhaust gas and therefore cannot overcome the problem of decline in thrust owing to such intake when the engine is operating at or below the maximum speed.

SUMMARY OF THE INVENTION

An object of this invention is therefore to overcome the foregoing problem by providing an engine speed control system for an outboard motor that can quickly overcome the problem of decline in thrust owing to intake of air and/or exhaust gas by the propeller, irrespective of operator skill, thereby improving power performance and steerability.

In order to achieve the object, this invention provides a system for controlling a speed of an internal combustion engine of an outboard motor that is adapted to be mounted on a stern of a boat and having a propeller powered by the engine to produce thrust that propels the boat in a forward or reverse direction in response to a shift position established by a shift mechanism, comprising: a throttle actuator connected to a throttle valve of the engine to open and close the throttle valve; an operation device provided to be manipulated by an operator to regulate the speed of the engine in accordance with an amount of manipulation; a manipulation amount detector which detects the amount of manipulation of the operation device; a desired throttle opening determiner which determines a desired opening of the throttle valve based on the detected amount of manipulation of the operation device; an actuator controller which controls operation of the throttle actuator to make an opening of the throttle valve equal to the desired throttle opening; a desired engine speed determiner which determines a desired speed of the engine based on the desired throttle opening; an engine speed detector which detects the speed of the engine; and an overrev discriminator which compares the detected engine speed with the desired engine speed and discriminates that the engine overrevs when the detected engine speed is larger than the desired engine speed; wherein the actuator controller implements an overrev prevention control to operate the throttle actuator to decrease the opening of the throttle valve such that the detected engine speed is lowered to the desired engine speed, when the engine is discriminated to overrev.

BRIEF DESCRIPTION OF THE DRAWINGS

The above and other objects and advantages of the invention will be more apparent from the following description and drawings in which.

DETAILED DESCRIPTION OF THE PREFERRED EMBODIMENTS

Embodiments of an engine speed control system for an outboard motor according to the present invention will now be explained with reference to the attached drawings.

Figure 1:
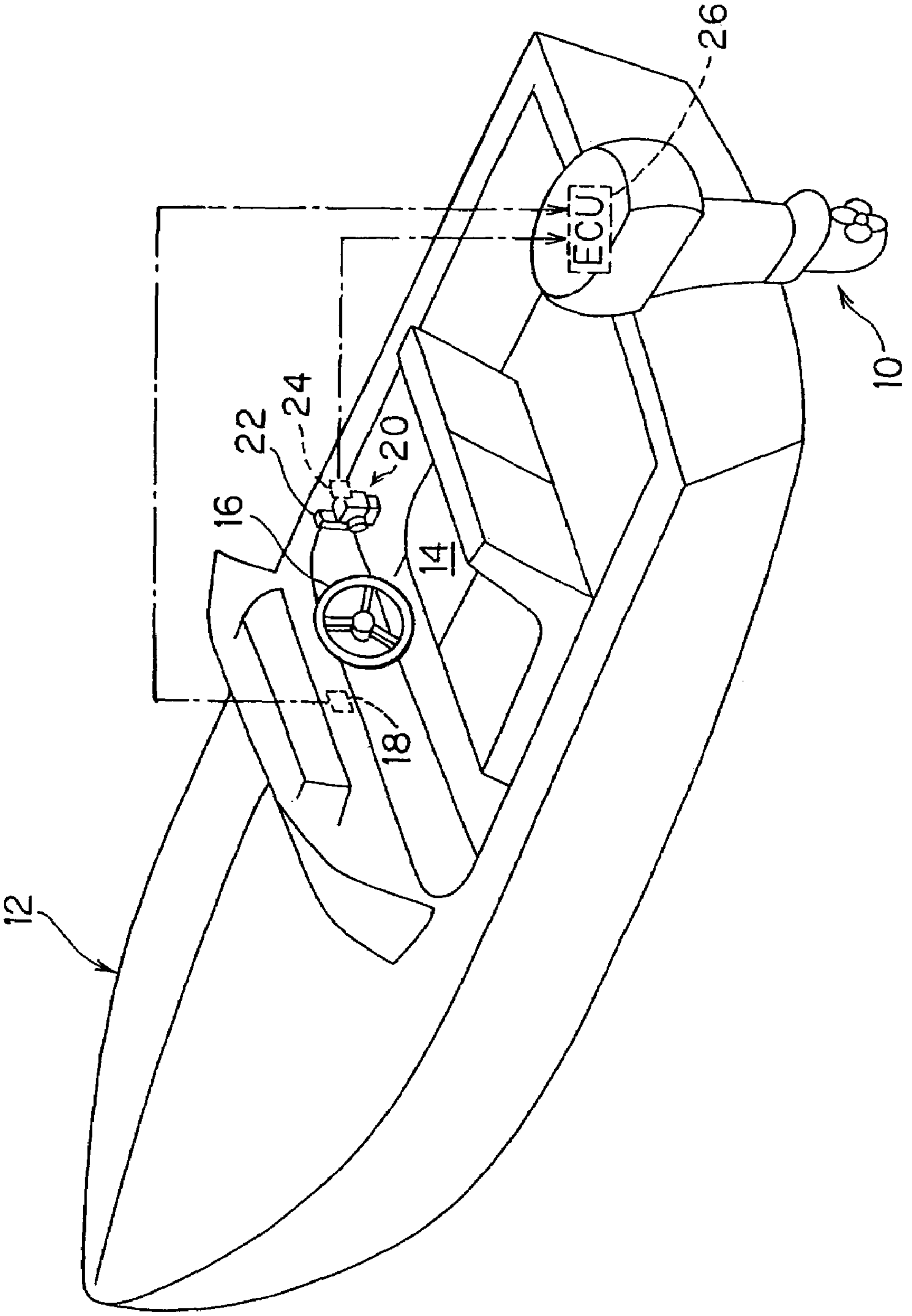
FIG. 1 is an overall schematic view of an engine speed control system for an outboard motor, including a boat (hull), according to a first embodiment of the invention.
Figure 2:
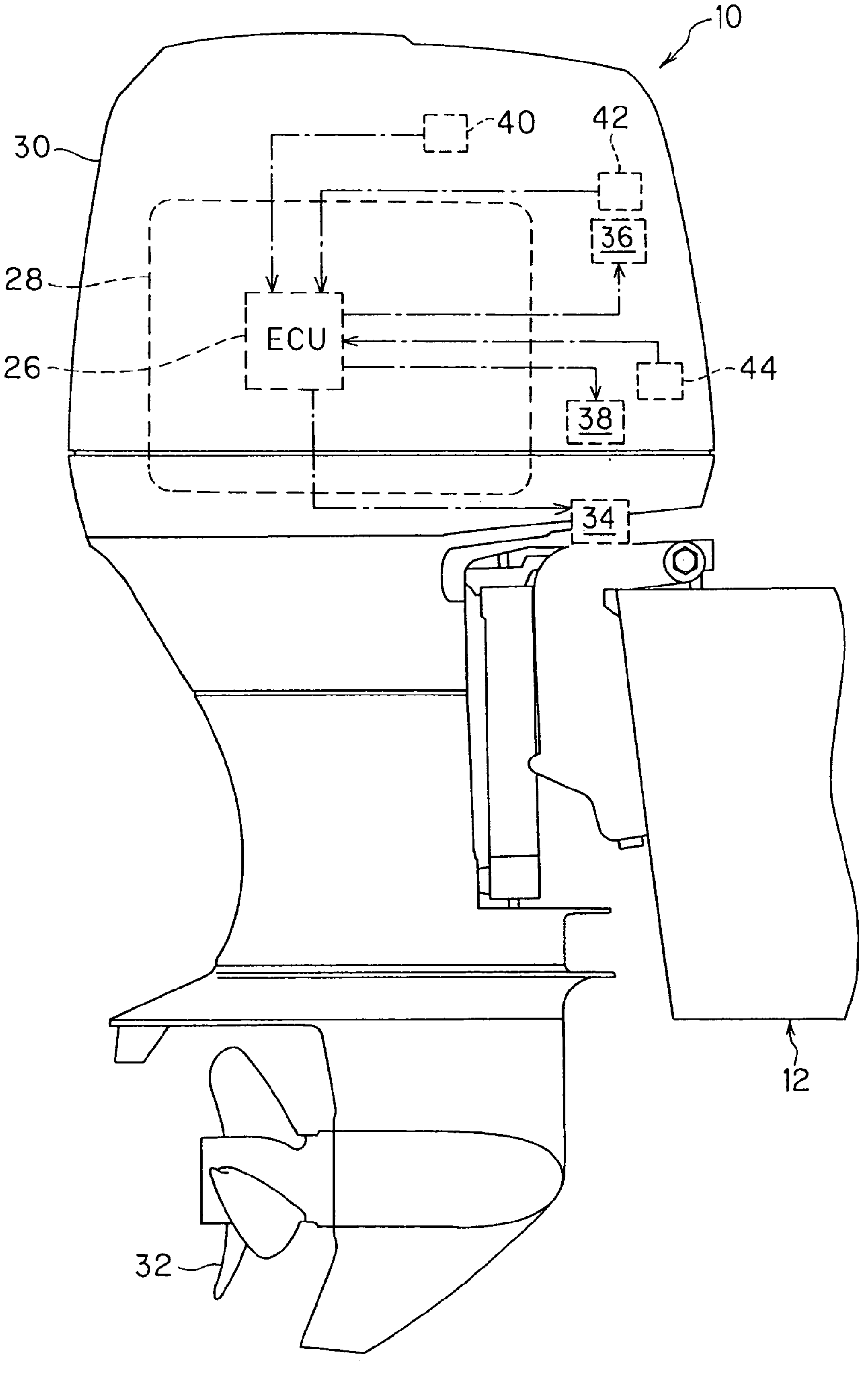
FIG. 2 is a side view of the outboard motor shown in FIG. 1.

FIG. 1 is an overall schematic view of an engine speed control system for an outboard motor, including a boat (hull), according to a first embodiment of the invention and FIG. 2 is a side view of the outboard motor shown in FIG. 1.

In FIGS. 1 and 2, the symbol 10 indicates an outboard motor. The outboard motor 10 is mounted on the stem (transom) of a boat (hull) 12.

As shown in FIG. 1, a steering wheel 16 is installed near a cockpit (the operator's seat) 14 of the boat 12. A steering wheel angle sensor 18 is installed near a shaft (not shown) of the steering wheel 16 and outputs or generates a signal indicative of the rotation amount of the shaft of the steering wheel 16, i.e., the steered angle (manipulated variable) of the steering wheel 16 manipulated by the operator.

A remote control box 20 is installed near the cockpit 14. The remote control box 20 is installed or provided with an operation lever (operation device) 22 that is to be manipulated by the operator. Specifically, the operation lever 22 is free to rotate (oscillate) in the backward and forward directions (pulling and pushing directions for the operator) from the initial position, and is positioned to be manipulated by the operator to input an instruction to shift or to regulate a speed of an internal combustion engine in accordance with an amount of manipulation.

The remote control box 20 is equipped with a lever position sensor (manipulation amount detector) 24 that outputs or generates signals in response to a manipulated angle θ of the operation lever 22 (amount of manipulation of the operation device by the operator). More specifically, this indicates that the above-mentioned instruction to shift or regulate the engine speed is made in accordance with the manipulated angle θ (amount of rotation) of the operation lever (device) 22. The outputs from the steering wheel angle sensor 18 and lever position sensor 24 are sent to an electronic control unit (hereinafter referred to as "ECU") 26 mounted on the outboard motor 10. The ECU 26 comprises a microcomputer.

As shown in FIG. 2, the outboard motor 10 is equipped with the internal combustion engine (now assigned with reference numeral 28 and hereinafter referred to as "engine") at its upper portion. The engine 28 is a spark-ignition gasoline engine. The engine 28 is located above the water surface and enclosed by an engine cover 30. The ECU 26 is installed in the engine cover 30 at a location near the engine 28.

The outboard motor 10 is equipped at its lower portion with a propeller 32. The propeller 32 is powered by the engine 28 to generate thrust that propels the boat 12 in the forward and reverse directions.

The outboard motor 10 is further equipped with an electric steering motor (steering actuator) 34 that steers the outboard motor 10 to the right and left directions, an electric throttle motor (throttle actuator) 36 that opens and closes a throttle valve (not shown in FIG. 2) of the engine 28 and an electric shift motor (shift actuator) 38 that operates a shift mechanism (not shown in FIG. 2) to change a shift position.

A crank angle sensor (engine speed detector) 40 is installed near a crankshaft (not shown) of the engine 28. The crank angle sensor 40 outputs or generates a crank angle signal once every predetermined crank angle (e.g., 30 degrees) and the outputs are successively sent to the ECU 26. The ECU 26 detects or calculates engine speed NE by counting the outputs from the crank angle sensor 40.

A throttle position sensor 42 is installed near the electric throttle motor 36 and outputs or generates a signal indicative of a throttle opening θ TH. Further, a shift position sensor (detector) 44 is installed near the electric shift motor 38 and outputs or generates a signal indicative of the shift position of the outboard motor 10. The outputs from the throttle position sensor 42 and shift position sensor 44 are also sent to the ECU 26.

Figure 3:
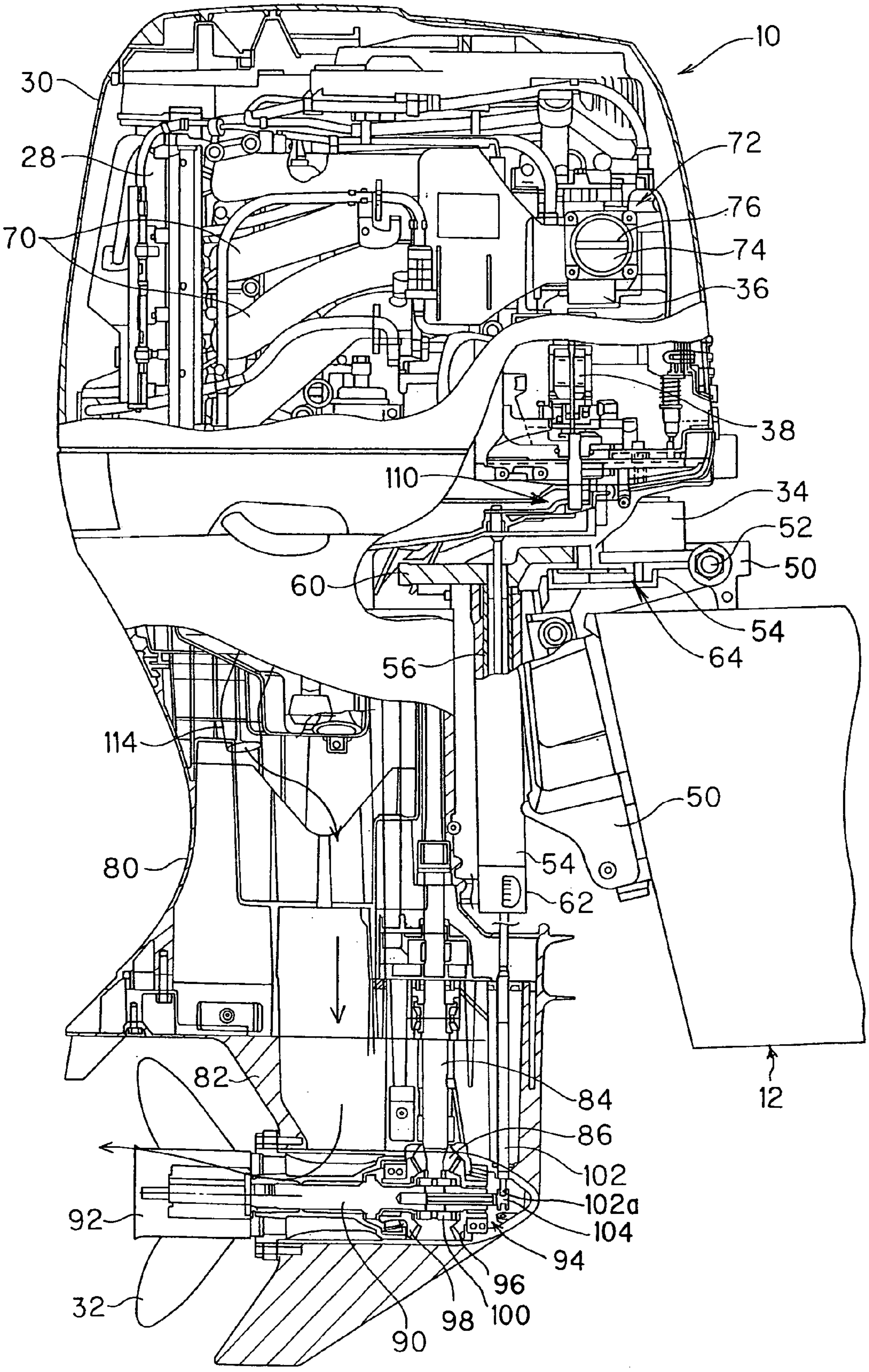
FIG. 3 is a partial sectional side view of the outboard motor shown in FIG. 1.

The structure of the outboard motor 10 will now be described in detail with reference to FIG. 3. FIG. 3 is a partial sectional view of the outboard motor 10.

As shown in FIG. 3, the outboard motor 10 is equipped with stem brackets 50 fastened to the stern of the boat 12, such that the outboard motor 10 is mounted on the stem of the boat 12 through the stem brackets 50. A swivel case 54 is attached to the stem brackets 50 through a tilting shaft 52.

A swivel shaft 56 is housed in the swivel case 54 to be freely rotated about a vertical axis. The upper end of the swivel shaft 56 is fastened to a mount frame 60 and the lower end thereof is fastened to a lower mount center housing 62. The mount frame 60 and lower mount center housing 62 are fastened to a frame (not shown) constituting a main body of the outboard motor 10.

The upper portion of the swivel case 54 is installed with the electric steering motor 34. The output shaft of the electric steering motor 34 is connected to the mount frame 60 via a speed reduction gear mechanism 64. Specifically, a rotational output generated by driving the electric steering motor 34 is transmitted via the speed reduction gear mechanism 64 to the mount frame 60 such that the outboard motor 10 is steered about the swivel shaft 56 as a rotational axis to the right and left directions (i.e., steered about the vertical axis).

The engine 28 has an intake pipe or passage 70 that is connected to a throttle body 72. The throttle body 72 has a throttle valve 74 installed therein and the electric throttle motor 36 is integrally disposed thereto. The output shaft of the electric throttle motor 36 is connected via a speed reduction gear mechanism (not shown) installed near the throttle body 72 with a throttle shaft 76 that supports the throttle valve 74. Specifically, a rotational output generated by driving the electric throttle motor 36 is transmitted to the throttle shaft 76 to open and close the throttle valve 74, thereby regulating an air intake amount of the engine 28 to regulate the engine speed NE.

It should be noted that the throttle position sensor 42 shown in FIG. 2 (not shown in FIG.3) outputs or generates the signal indicative of the throttle opening θ TH in response to the rotation angle of the throttle shaft 76. The output is sent to the ECU 26.

An extension case 80 is installed at the lower portion of the engine cover 30 to cover the engine 28 and a gear case 82 is installed at the lower portion of the extension case 80. A drive shaft (a vertical shaft) 84 is rotatably supported in the extension case 80 and gear case 82 to be parallel with the vertical axis. One end (upper end) of the drive shaft 84 is connected to the crankshaft (not shown) of the engine 28 and the other end (lower end) thereof is equipped with a pinion gear 86. A propeller shaft 90 is rotatably supported in the gear case 82 to be parallel with the front and back direction of the outboard motor 10. The propeller 32 is attached to the propeller shaft 90 via a boss portion 92.

A shift mechanism 94 is housed in the gear case 82 and comprises a forward bevel gear 96, a reverse bevel gear 98, a clutch 100, a shift rod 102 and a shift slider 104. The forward bevel gear 96 and reverse bevel gear 98 that are positioned on the outer circumference of the propeller shaft 90, mesh with the pinion gear 86 and rotate in the opposite directions from each other. A clutch 100 that integrally rotates with the propeller shaft 90 is installed between the forward bevel gear 96 and reverse bevel gear 98.

The shift rod 102 is rotatably supported in the gear case 82 to be parallel with the vertical axis. The clutch 100 is connected through the shift slider 104 to a rod pin 102*a* provided on the bottom surface of the shift rod 102. The rod pin 102*a* is formed at a position eccentric to the center axis of the bottom surface of the rod pin 102 by a predetermined distance. In other words, in response to the rotation of the shift rod 102, the rod pin 102*a* displaces along a locus of circular arc whose radius is corresponding to the predetermined distance (amount of eccentricity).

The displacement of the rod pin 102*a* is transmitted via the shift slider 104 to the clutch 100 as that parallel with the front and back direction of the outboard motor 10 (i.e., vertical direction of the propeller shaft 90). With this, the clutch 100 slides to a position where the clutch 100 is brought into engagement with the forward bevel gear 96 or the reverse bevel gear 98, or to a position where no engagement is established.

When the clutch 100 is meshed with the forward bevel gear 96, the rotation of the drive shaft 84 is transmitted through the pinion gear 86 and forward bevel gear 96 to the propeller shaft 90 such that the propeller 32 rotates to produce the thrust that propels the boat 12 in the forward direction. With this, the forward position (shift position) is established.

On the other hand, when the clutch 100 is meshed with the reverse bevel gear 98, the rotation of the drive shaft 84 is transmitted through the pinion gear 86 and reverse bevel gear 98 to the propeller shaft 90 such that the propeller 32 rotates in the direction opposite from that during forward travel of the boat 12 and propels the boat 12 in the reverse direction. With this, the reverse position (shift position) is established. When the clutch 100 is not meshed with any of the forward bevel gear 96 and the reverse bevel gear 98, the rotation of the drive shaft 84 is not transmitted to the propeller shaft 90. With this, the neutral position (shift position) is established. Thus the shift mechanism 94 has three shift positions including the forward, reverse and neutral positions.

The shift rod 102 extends and penetrates the gear case 82 and swivel case 54 (more precisely, the interior space of the swivel shaft 56 housed therein), and finally reaches at a location in the vicinity of the engine cover 30 at its top end. The above-mentioned electric shift motor 38 is installed inside the engine cover 30 and the output shaft thereof is connected to the top end of the shift rod 102 via a speed reduction gear mechanism 110. Specifically, the electric shift motor 38 is driven to rotate the shift rod 102 such that the shift is changed among the forward, neutral and reverse positions. The shift position sensor 44 described with reference to FIG. 2 (not shown in FIG. 3) outputs or generates the signal indicative of the shift position in response to the rotation angle of the shift rod 102. The output is sent to the ECU 26.

As indicated by the arrows in FIG. 3, the exhaust gas (combusted gas) emitted from the engine 28 is discharged from the exhaust pipe 114 into the extension case 80. The exhaust gas discharged into the extension case 80 further passes through the interior of the gear case 82 and the interior of the propeller boss portion 92 to be discharged into the water to the rear of the propeller 32. When, owing to low engine speed NE, the water pressure (backpressure acting on the propeller boss portion 92) is greater than the exhaust pressure, the engine exhaust gas is discharged into the air through an idle port (not shown).

Figure 4:
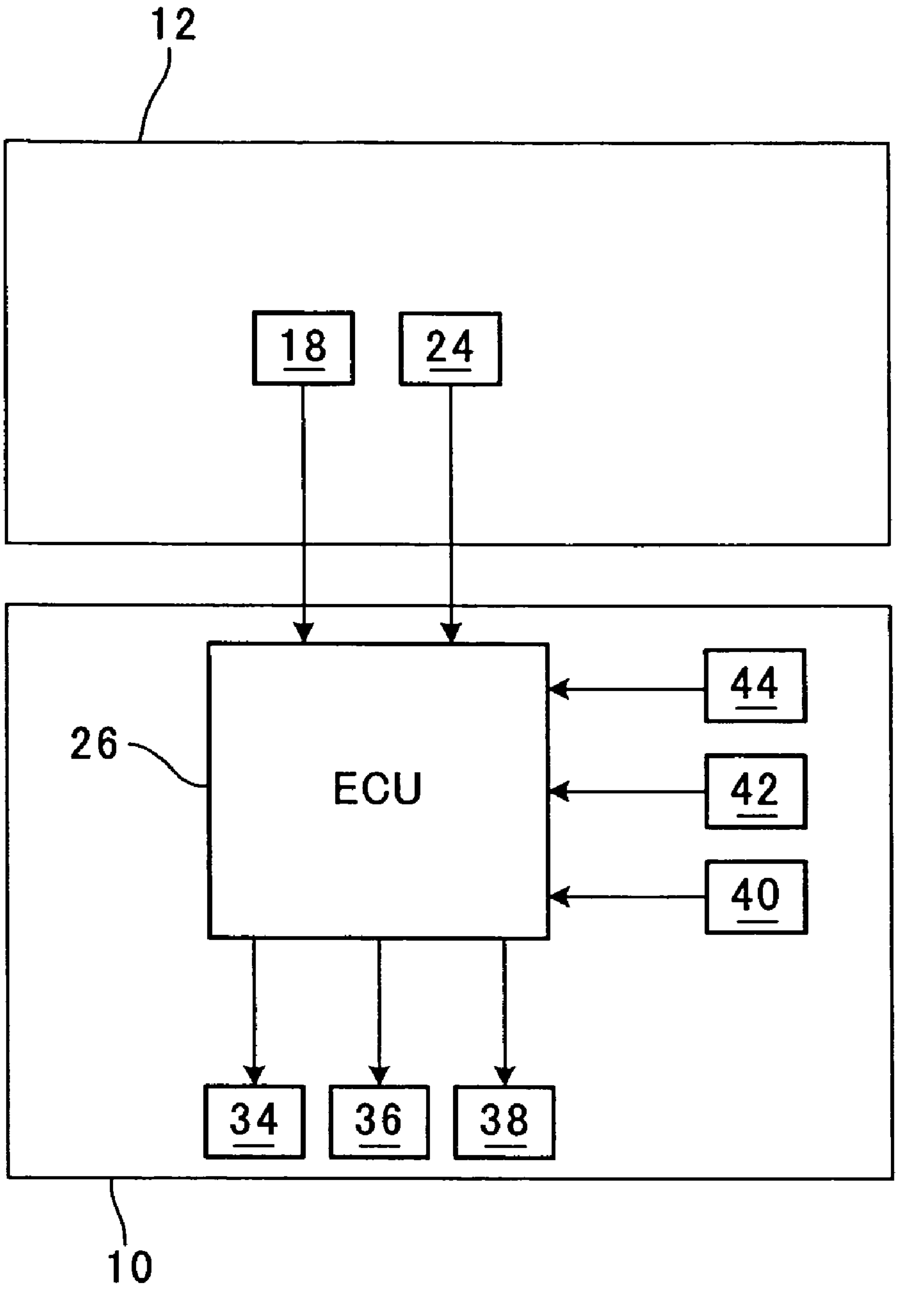
FIG. 4 is a block diagram showing the configuration of the system shown in FIG. 1.

FIG. 4 is a block diagram showing the configuration of the engine speed control system for an outboard motor according to this embodiment.

As shown in FIG. 4, the outputs of the sensors 18, 24, 40, 42 and 44 are sent to the ECU 26. The ECU 26 controls the operation of the electric steering motor 34 based on the output of the steering angle sensor 18 (among the outputs received) to steer the outboard motor 10 left and right.

The ECU 26 also changes the shift position by controlling the operation of the electric shift motor 38 based on the manipulated angle θ of the operation lever 22 detected by the lever position sensor 24 (more exactly, the manipulated direction of the operation lever 22 determined from the detected value). The ECU 26 further controls the operation of the electric throttle motor 36 based on the manipulated angle θ detected by the lever position sensor 24 (more exactly, the magnitude of the detected value), the engine speed NE detected by the crank angle sensor 40, the throttle opening θTH detected by the throttle position sensor 42, and the shift position of the outboard motor 10 detected by the shift position sensor 44.

Figure 5:
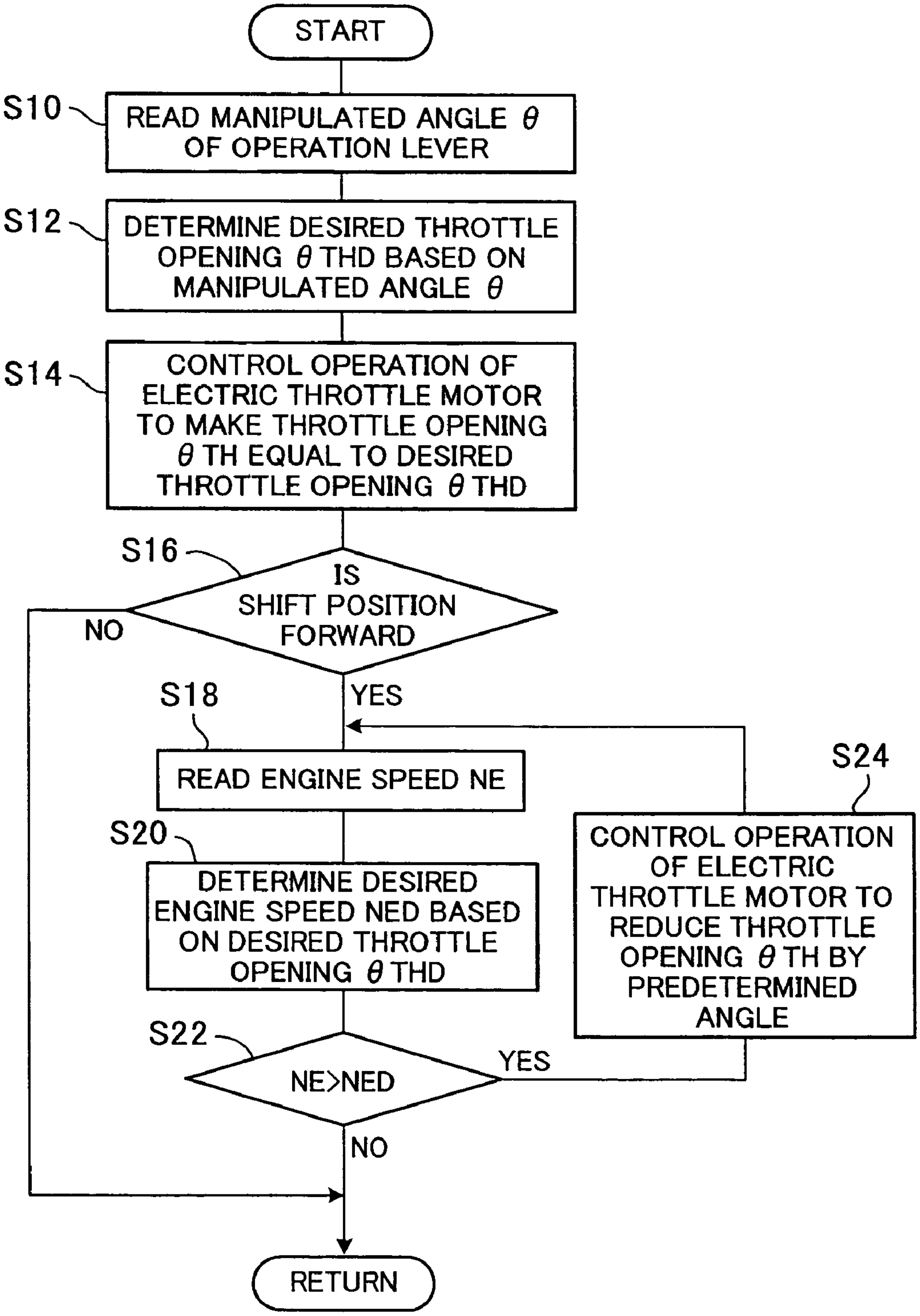
FIG. 5 is a flowchart showing the sequence of processes in the operation of the system shown in FIG. 1.

FIG. 5 is a flowchart showing the sequence of processes in the operation of the engine speed control system for an outboard motor according to this embodiment, more specifically, the sequence of processes for controlling the operation of the electric throttle motor 36. The illustrated routine is executed in the ECU 26.

First, in S10, the manipulated angle θ of the operation lever 22 (amount of manipulation of the operation device) is read. Then, in S12, a desired throttle opening θTHD of the throttle valve 74 is determined based on the manipulated angle θ.

Figure 6:
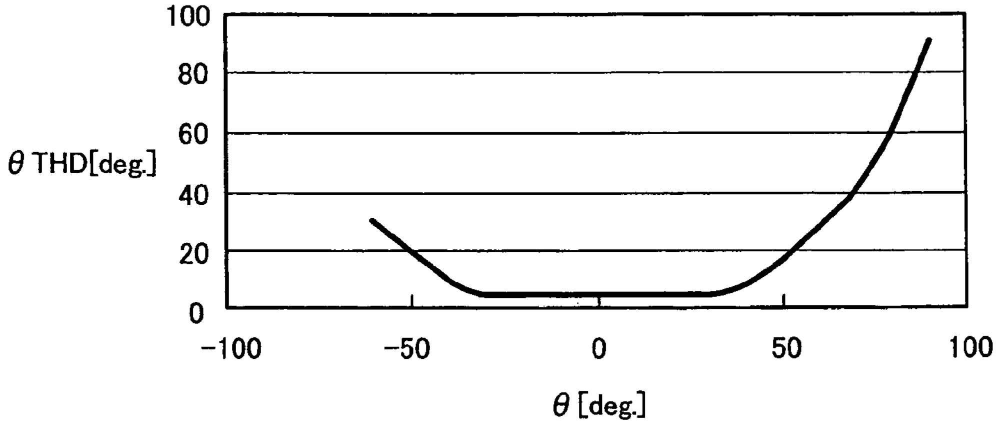
FIG. 6 is a graph showing a curve representing the characteristic of a desired throttle opening with respect to a manipulated angle of an operation lever, to be used in processing of the operation in the flowchart shown in FIG. 5.

FIG. 6 is a graph showing characteristic curve of the desired throttle opening θTHD relative to the manipulated angle θ. In FIG. 6, it is assumed that the manipulated angle θ is zero degree when the operation lever 22 is in the initial position, and it is a positive value when the operator pulls the operation lever 22 toward himself while it is a negative when the operator pushes it away from himself. The fact that the manipulated angle θ is zero (or near zero) indicates that the shift position instruction made by the operator is neutral. The manipulated angle θ being a positive value indicates that the shift position instruction made by the operator is forward and its being a negative value indicates the shift position instruction made by the operator is reverse. In another routine not illustrated in the drawing, the operation of the electric shift motor 38 is controlled based on the discriminated operator instruction to change the shift position of the outboard motor 10.

As shown in FIG. 6, the desired throttle opening θTHD is determined or defined to increase with increasing value (absolute value) of the manipulated angle θ. Therefore, if the amount of manipulation of the operation lever 22 by the operator is large, the engine speed NE increases accordingly.

The explanation of the flowchart of FIG. 5 will be resumed.

Next in S14, the operation of the electric throttle motor 36 is controlled to make the throttle opening θTH (actual angle) equal to the desired throttle opening θTHD (i.e., regulate the throttle valve 74 to the desired throttle opening θTHD).

Next, S16, it is determined from the output of the shift position sensor 44 whether the shift position of the outboard motor 10 is forward. When the result in S16 is NO, i.e., when the shift position is neutral or reverse, the remaining steps of the routine are skipped.

On the other hand, when the result is YES, the program proceeds to S18, in which the engine speed NE is read, and to S20, in which a desired speed NED of the engine 28 is determined based on the desired throttle opening θTHD.

Figure 7:
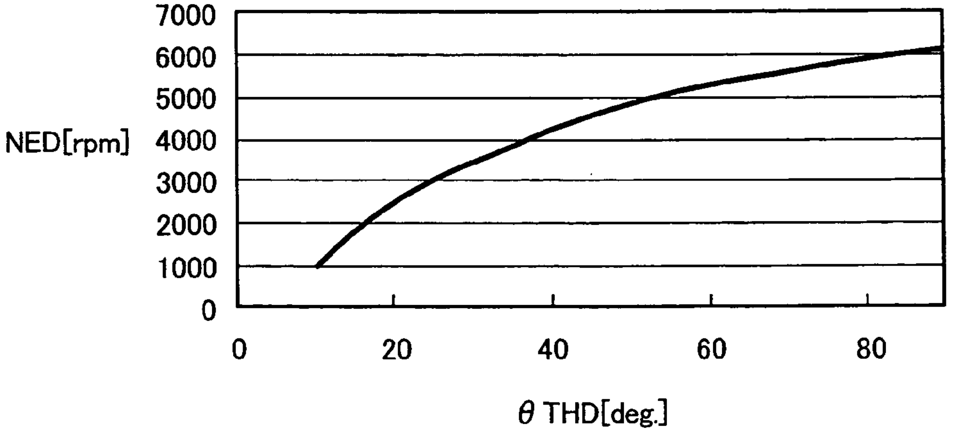
FIG. 7 is a graph showing a curve representing the characteristic of a desired speed with respect to the desired throttle opening, to be used in processing of the operation in the flowchart shown in FIG. 5.

FIG. 7 is a graph showing characteristic curve of the desired speed NED relative to the desired throttle opening θTHD. As shown in FIG. 7, the desired speed NED is determined or defined to increase with increasing desired throttle opening θTHD. Specifically, the desired speed NED is determined by determining the engine speed NE for every throttle opening θTH when a predetermined load acts on the engine 28 (more exactly, when the propeller 32 does not suck in air or exhaust gas).

Since the aforesaid predetermined load varies depending on the size of the boat 12 and the shape of the propeller, the characteristic curve shown in FIG. 7 is corrected during cruising based on the correlation between the engine speed NE and the throttle opening θTH. For example, the average value of the engine speed NE when the throttle opening θTH exhibits a certain value is determined or defined as the desired speed NED corresponding to that throttle opening. However, the desired speed NED is never determined or defined to be higher than the maximum speed of the engine 28.

Returning to the explanation of the flowchart of FIG. 5, next in S22, the engine speed NE (actual speed) and the desired speed NED are compared to determine whether the engine speed NE is greater than the desired speed NED, in other words, whether the engine 28 overrevs. As explained above, the desired speed NED is a value defined by determining the engine speed for every throttle opening when the predetermined load acts on the engine 28 (more exactly, when the propeller 32 does not suck in air or exhaust gas). The determination in S22 as to whether the engine 28 overrevs therefore amounts to determining whether the load (engine load) has decreased, i.e., whether intake of air and/or exhaust gas by the propeller has occurred.

When the result in S22 is YES, i.e., when the engine 28 is found to overrev (from which it can be concluded that the load has declined because the propeller 32 sucks in air and/or exhaust gas), the program proceeds to S24, in which the operation of the electric throttle motor 36 is controlled to reduce the current throttle opening θTH by a predetermined angle (amount; e.g., 0.1 degree). The processes of S18 to S22 are then repeated until the result in S22 becomes NO, i.e., until it is found that the engine 28 does not overrev, whereupon S24 is skipped and execution of the routine is restarted from S10.

Thus in the processing steps from S18 onward, the engine speed NE and the desired speed NED are compared to determine whether the engine 28 overrevs, and when the engine 28 is found to overrev, the operation of the electric throttle motor 36 is controlled in the direction of reducing the throttle opening θTH (i.e., the throttle valve 74 is moved in the closing direction), whereby control is effected to lower the engine speed NE to the desired speed NED. The processes from S18 onward are called "overrev prevention control."

As is clear from the process of S16, the foregoing overrev prevention control is not implemented when the shift position of the outboard motor 10 is neutral or reverse. Overrev prevention control is not required when in neutral because transmission of the engine output to the propeller is cut off in neutral. When the shift position is reverse, the fact that the outboard motor 10 is built to discharge exhaust gas through the propeller boss portion 92 increases the likelihood of exhaust gas being drawn in to cause a rise in the engine speed NE. However, as can be seen from the characteristic curve of FIG. 6, cruising in the low-speed region (travel at small throttle opening) is predominant during reverse travel, so that the required thrust can be obtained even if exhaust gas is sucked in to cause increase in engine speed. Overrev prevention control is therefore not implemented in the reverse position.

Thus the engine speed control system for an outboard motor according to the first embodiment is configured to execute overrev prevention control which determines whether the engine 28 overrevs by comparing the detected engine speed NE and the desired speed NED and responds to a determination that the engine 28 overrevs (in which case the cause of the increase in the engine speed NE is probably reduced load caused by sucking in of air and/or exhaust gas by the propeller 32) by driving the electric throttle motor 36 in the direction of reducing the throttle opening θTH, thereby lowering the engine speed NE to the desired speed NED. Owing to this configuration, the problem of decline in thrust owing to intake of air and/or exhaust gas by the propeller 32 can be quickly overcome irrespective of operator skill, thereby improving power performance and steerability.

Since the overrev prevention control is implemented only when the shift position of the outboard motor 10 is forward, unnecessary engine speed control is avoided.

An engine speed control system for an outboard motor according to a second embodiment of this invention will now be explained.

Figure 8:
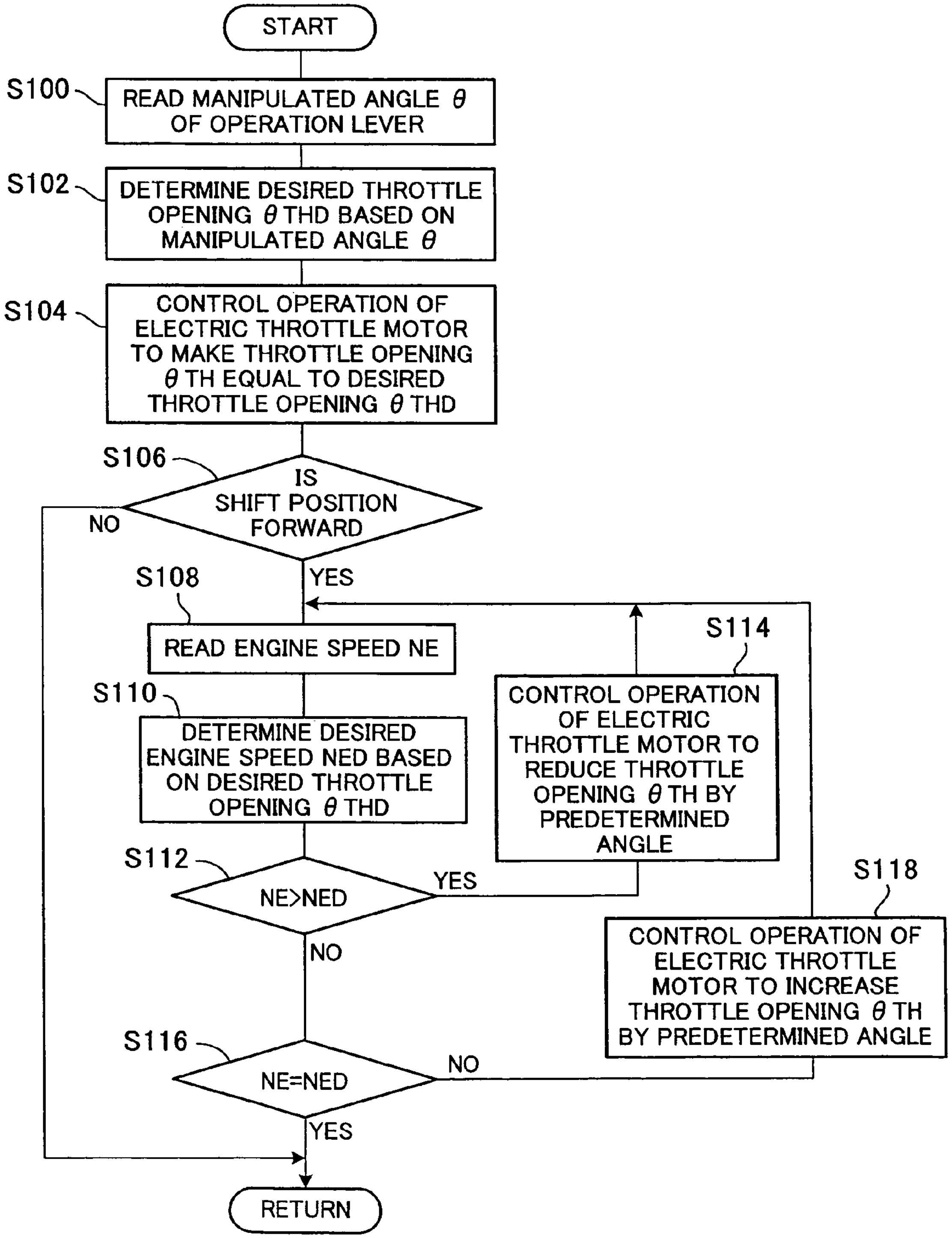
FIG. 8 is a flowchart similar to FIG. 5, but showing the sequence of processes in the operation of an engine speed control system for an outboard motor according to a second embodiment.

FIG. 8 is a flowchart showing the sequence of processes in the operation of the engine speed control system for an outboard motor according to the second embodiment.

First, in S100 to S112, the same processes as those of S10 to S22 of the flowchart of FIG. 5 are performed.

When the result in S112 is YES, the program proceeds to S114, in which, similarly to in S24 of the flowchart of FIG. 5, the operation of the electric throttle motor 36 is controlled to reduce the current throttle opening θTH, whereafter the processes of S108 to S112 are repeated. Thus the foregoing overrev prevention control is also implemented in the second embodiment.

When the result in S112 is NO, the program proceeds to S116, in which it is determined whether the engine speed NE is the same as the desired speed NED. When the result in S116 is NO, i.e., when it is found that the engine speed NE is smaller than the desired speed NED, the program proceeds to S118, in which the operation of the electric throttle motor 36 is controlled to increase the throttle opening θTH by a predetermined angle (amount; make the throttle opening θTH (actual angle) equal to the desired throttle opening θTHD e.g., 0.1 degree), whereafter the processes of S108 onward are repeated. When the result in S116 becomes YES, S118 is skipped and execution of the routine is restarted from S100.

The other aspects of second embodiment are not explained here because they are the same as those of the first embodiment.

Thus in the engine speed control system for an outboard motor according to the second embodiment, the overrev prevention control explained regarding the first embodiment is carried out (processes of S100 to S114) and, in addition, when the engine speed NE is found to be smaller than the desired speed NED, the electric throttle motor 36 is operated to increase the throttle opening θTH (i.e., the throttle valve 74 is moved in the opening direction), whereby the engine speed NE is raised to the desired speed NED. Therefore, the second embodiment not only achieves the effects explained with regard to the first embodiment but can also quickly overcome the problem of decline in thrust owing to increased load, irrespective of operator skill, thereby further improving power performance and handling stability.

The first and second embodiments are thus configured to have a system for controlling a speed of an internal combustion engine (28) mounted on an outboard motor (10) that is mounted on a stem of a boat (12) and having a propeller (32) powered by the engine to produce thrust that propels the boat in a forward or reverse direction in response to a shift position established by a shift mechanism, comprising: a throttle actuator (electric throttle motor 36) connected to a throttle valve (74) of the engine to open and close the throttle valve; an operation device (operation lever 22) provided to be manipulated by an operator to input an instruction to regulate the speed of the engine in accordance with an amount of manipulation; a manipulation amount detector (lever position sensor 24) detecting the amount of manipulation of the operation device; a desired throttle opening determiner (ECU 26, S10, S12, S100, S102) determining a desired opening of the throttle valve θTHD based on the detected amount of manipulation of the operation device; an actuator controller (ECU 26, S14, S104) controlling operation of the throttle actuator to make an opening of the throttle valve θTH equal to the desired throttle opening; a desired engine speed determiner (ECU 26, S20, S110) determining a desired speed of the engine NED based on the desired throttle opening; an engine speed detector (crank angle sensor 40, ECU 26) detecting the speed of the engine NE; and an overrev discriminator (ECU 26, S22, S112) comparing the detected engine speed NE with the desired engine speed NED and discriminating that the engine overrevs when the detected engine speed is larger than the desired engine speed; wherein the actuator controller implements an overrev prevention control to operate the throttle actuator to decrease the opening of the throttle valve such that the detected engine speed is lowered to the desired engine speed, when the engine is discriminated to overrev (ECU 26, S24, S14).

In the system, the actuator controller operates the throttle actuator to successively decrease the opening of the throttle valve by a predetermined amount such that the detected engine speed NE is lowered to the desired engine speed (ECU 26, S24, S14).

The system further includes: a shift position detector (shift position sensor 44) detecting the shift position established by the shift mechanism; and the actuator controller implements the overrev prevention control when the shift position is detected to be forward (ECU 26, S16, S106).

In the system, the actuator controller operates the throttle actuator to increase the opening of the throttle valve such that the detected engine speed NE is raised to the desired engine speed NED, when the detected engine speed is smaller than the desired engine speed (ECU 26, S112, S116, S118).

In the system, the actuator controller operates the throttle actuator to successively increase the opening of the throttle valve by a predetermined amount such that the detected engine speed is raised to the desired engine speed (ECU 26, S112, S116, S118).

In the system, the desired throttle opening determiner determines the desired throttle opening θTHD such that the desired throttle opening increases with increasing amount of manipulation of the operation device (ECU 26, S12, S112).

In the system, the desired engine speed determiner determines the desired engine speed NED such that the desired engine speed increases with increasing desired throttle opening θTHD (ECU 26, S20, S120).

It should be noted in the above that, although the actuator for opening and closing the throttle valve 74 is exemplified as an electric motor (the electric throttle motor 36), it may instead be a hydraulic cylinder, magnetic solenoid or other such actuator.

It should also be noted in the above that, although the operation member used by the operator to input engine speed regulation instructions is exemplified as a lever (the operation lever 22), it may instead be any of various other types of input means such as a pedal or switch.

Japanese Patent Application No. 2004-261254 filed on Sep. 8, 2004, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A system for controlling a speed of an internal combustion engine of an outboard motor that is adapted to be mounted on a stern of a boat and having a propeller powered by the engine to produce thrust that propels the boat in a forward or reverse direction in response to a shift position established by a shift mechanism, comprising:

- a throttle actuator connected to a throttle valve of the engine to open and close the throttle valve;
- an operation device provided to be manipulated by an operator to regulate the speed of the engine in accordance with an amount of manipulation;
- a manipulation amount detector which detects the amount of manipulation of the operation device;
- a desired throttle opening determiner which determines a desired opening of the throttle valve based on the detected amount of manipulation of the operation device;
- an actuator controller which controls operation of the throttle actuator to make an opening of the throttle valve equal to the desired throttle opening;
- a desired engine speed determiner which determines a desired speed of the engine based on the desired throttle opening;
- an engine speed detector which detects the speed of the engine; and
- an overrev discriminator which compares the detected engine speed with the desired engine speed and discriminates that the engine overrevs when the detected engine speed is larger than the desired engine speed;
- wherein the actuator controller implements an overrev prevention control to operate the throttle actuator to decrease the opening of the throttle valve such that the detected engine speed is lowered to the desired engine speed, when the engine is discriminated to overrev.

2. The system according to claim 1, wherein the actuator controller operates the throttle actuator to successively decrease the opening of the throttle valve by a predetermined amount such that the detected engine speed is lowered to the desired engine speed.

3. The system according to claim 1, further including:

- a shift position detector detecting the shift position established by the shift mechanism;
- wherein the actuator controller implements the overrev prevention control when the shift position is detected to be forward.

4. The system according to claim 1, wherein the actuator controller operates the throttle actuator to increase the opening of the throttle valve such that the detected engine speed is raised to the desired engine speed, when the detected engine speed is smaller than the desired engine speed.

5. The system according to claim 4, wherein the actuator controller operates the throttle actuator to successively increase the opening of the throttle valve by a predetermined amount such that the detected engine speed is raised to the desired engine speed.

6. The system according to claim 1, wherein the desired throttle opening determiner determines the desired throttle opening such that the desired throttle opening increases with increasing amount of manipulation of the operation device.

7. The system according to claim 1, wherein the desired engine speed determiner determines the desired engine speed such that the desired engine speed increases with increasing desired throttle opening.

8. A method of controlling a speed of an internal combustion engine of an outboard motor that is mounted on a stem of a boat and having a propeller powered by the engine to produce thrust that propels the boat in a forward or reverse direction in response to a shift position established by a shift mechanism, a throttle actuator connected to a throttle valve of the engine to open and close the throttle valve, an operation device provided to be manipulated by an operator to input an instruction to regulate the speed of the engine in accordance with an amount of manipulation, comprising the steps of:

detecting the amount of manipulation of the operation device;

determining a desired opening of the throttle valve based on the detected amount of manipulation of the operation device;

controlling operation of the throttle actuator to make an opening of the throttle valve equal to the desired throttle opening;

determining a desired speed of the engine based on the desired throttle opening;

detecting the speed of the engine; and comparing the detected engine speed with the desired engine speed and discriminating that the engine overrevs when the detected engine speed is larger than the desired engine speed;

wherein the step of actuator controlling implements an overrev prevention control to operate the throttle actuator to decrease the opening of the throttle valve such that the detected engine speed is lowered to the desired engine speed, when the engine is discriminated to overrev.

9. The method according to claim 8, wherein the step of actuator controlling operates the throttle actuator to successively decrease the opening of the throttle valve by a predetermined amount such that the detected engine speed is lowered to the desired engine speed.

10. The method according to claim 8, further including the step of:

detecting the shift position established by the shift mechanism;

wherein the step of actuator controlling implements the overrev prevention control when the shift position is detected to be forward.

11. The method according to claim 8, wherein the step of actuator controlling operates the throttle actuator to increase the opening of the throttle valve such that the detected engine speed is raised to the desired engine speed, when the detected engine speed is smaller than the desired engine speed.

12. The method according to claim 11, wherein the step of actuator controlling operates the throttle actuator to successively increase the opening of the throttle valve by a predetermined amount such that the detected engine speed is raised to the desired engine speed.

13. The method according to claim 8, wherein the step of desired throttle opening determining determines the desired throttle opening such that the desired throttle opening increases with increasing amount of manipulation of the operation device.

14. The method according to claim 8, wherein the step of desired engine speed determining determines the desired engine speed such that the desired engine speed increases with increasing desired throttle opening.

* * * * *